F. Woodward.
Bee Hive.
N° 33,059.    Patented Aug. 13, 1861.
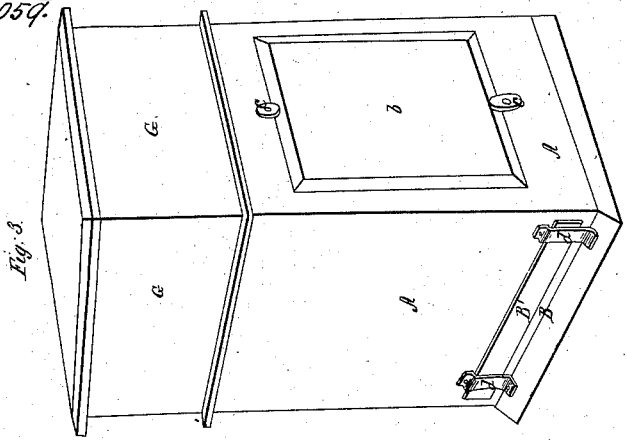
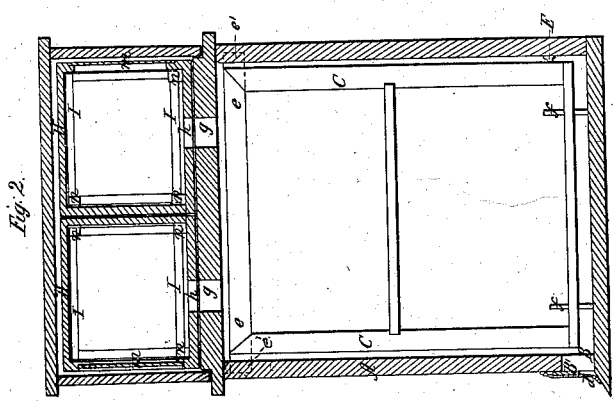
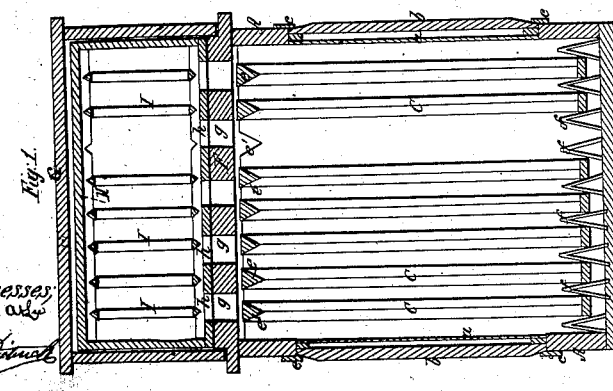
Witnesses;    Inventor;

UNITED STATES PATENT OFFICE.

FERDINAND WOODWARD, OF SACRAMENTO, CALIFORNIA.

BEEHIVE.

Specification of Letters Patent No. 33,059, dated August 13, 1861.

*To all whom it may concern:*

Be it known that I, FERDINAND WOODWARD, of Sacramento, in the county of Sacramento and State of California, have invented a new and useful Improvement in Beehives; and I do hereby declare that the following is a full, clear, and exact description of the same, reference being had to the accompanying drawings, forming a part of this specification, in which—

Figure 1, is a vertical transverse section of my improved hive. Fig. 2, is a vertical longitudinal section of the same, and Fig. 3, is a perspective view of the hive.

Similar letters of reference in each of the several figures indicate corresponding parts.

To enable others, skilled in the art, to make and use my invention, I will proceed to describe its construction and operation.

A, represents the outer case or box; it has inspection openings cut in two of its sides, said openings being closed by panes of glass $a, a$, which are protected by wooden panels $b, b$, said panels being simply confined by turn buttons $c, c$, in order that they may be taken out whenever it is desired to inspect the bees.

Near the bottom, on one side of the case, an ingress and egress passage B, for the bees is provided. In front of this passage, a glass slide B′, is arranged, being confined in position by means of flexible clamps $d, d$. This slide by being raised, leaves the passage open, and by being lowered closes the passage—its use is to graduate the size of the passage so that an excess of drone bees shall not pass into the hive—also to shut up the hive at certain periods so as to prevent the entrance of robber bees and the moth. The slide by being of glass, admits light into the lower portion of the hive and also allows of the entrance being inspected without opening the same, and the clamps by being flexible can be pressed inward and made to hold the slide at any point desired, without the aid of a catch or pin.

C, C, are a series of narrow comb frames arranged in the lower working chamber of the hive, being introduced through the top of the same. These frames are formed at top, bottom, and sides of narrow triangular shaped bars, and at the bottom of a flat bar. The ends of the upper triangular bar of each frame extend beyond the side bars so as to form triangular supporting tenons $e, e$, said tenons entering triangular mortises $e', e'$, cut in the inner sides of the upper edge of the case or box A, as represented. The lower bar of the frames enters between inverted V shaped stops $f, f$, projecting up from the bottom board of the hive; said stops being formed by bending wire into the form of an inverted V and fastening the two ends of the wire into the bottom board of the hive, as shown. The stops by being V shaped, form flaring spaces for the lower part of the frames to enter between them as they are lowered, and thus great ease of adjusting the frames between the stops is afforded, even if they have become expanded at their lower ends. Besides this, the stops are capable of yielding somewhat and thus the frames may be forced down between them to the extent desired and the space between them being wedge shaped, the frames will be very securely held. The stops keep the frames apart and act as guides to steady the frames until the apiarian has raised the frame out of the hive a distance which enables him to control it. If the frame is not thus guided, its lower end often moves laterally and disturbs the working bees or destroys the queen bees of contiguous frames. In order to give further the apiarian, control of the frame, a rest or bearing knob E, is placed on the outer side of one of the vertical bars of each frame, so that while each frame is being raised out of the case A, the apiarian may press the knob against the end of the case and thus prevent a chance of lateral swinging of the lower part of the frame.

The working chamber is covered by a board F, through which passages $g, g$, to the honey boxes are cut. On top of the board F, the box G, is arranged, and within this box, a honey box A, is placed, said honey boxes having passages $h, h$, communicating with the passages $g, g$, of the working chamber. One side of each of the honey boxes, has a glass slide $m$, in order that the honey may be inspected or removed. The honey boxes like the working chamber, have a series of narrow frames I, arranged within it, these frames are made of triangular bars and are held in position by means of cleats $n, n, n$, which have triangular shaped mortises cut in them to admit the triangular bars of which the frames are formed. The advantage of this construction of honey box, is this:—The apiarian has a chance to inspect the honey. He also can exhibit the honey at the store or at the market, and he can sell small frames or a series of frames, as purchasers may desire.

It will be observed that the top of the frames of the working chamber are below the cover F, and therefore there is no danger of killing bees when the cover is adjusted. This advantage results from the use of the V shaped stops and the triangular mortises and tenons.

What I claim as my invention and desire to secure by Letters Patent, is—

1. The arrangement for united use in a bee hive of triangular mortises $e, e$, triangular tenons $e', e'$, inverted V shaped stops $f, f$; and the rest or bearing knobs E, E, in the manner and for the purposes described.

2. The combination of the upper outer box G, inner boxes H. H, having glass slides $m, m$, the narrow movable frames I and cleats $n, n, n$, having V-shaped notches for holding said frames, in the manner and for the purpose described.

3. The arrangement of the glass valve B', of the ingress and egress passage B, and spring clamps $d, d$, in the manner and for the purposes described.

FERDINAND WOODWARD.

Witnesses:
GEO. H. BAKER,
HENRY F. BAKER.